Feb. 17, 1948.   J. A. A. MESSIER   2,436,014
CIRCULARLY SWUNG CAPTIVE GLIDER
Filed Jan. 8, 1946   4 Sheets-Sheet 1

INVENTOR
Joseph A. A. Messier,
BY
ATTORNEY

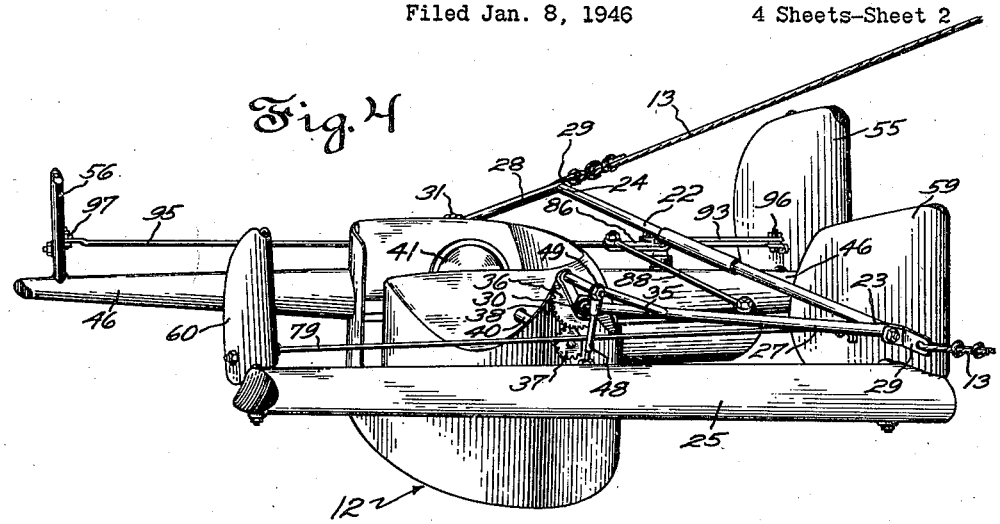
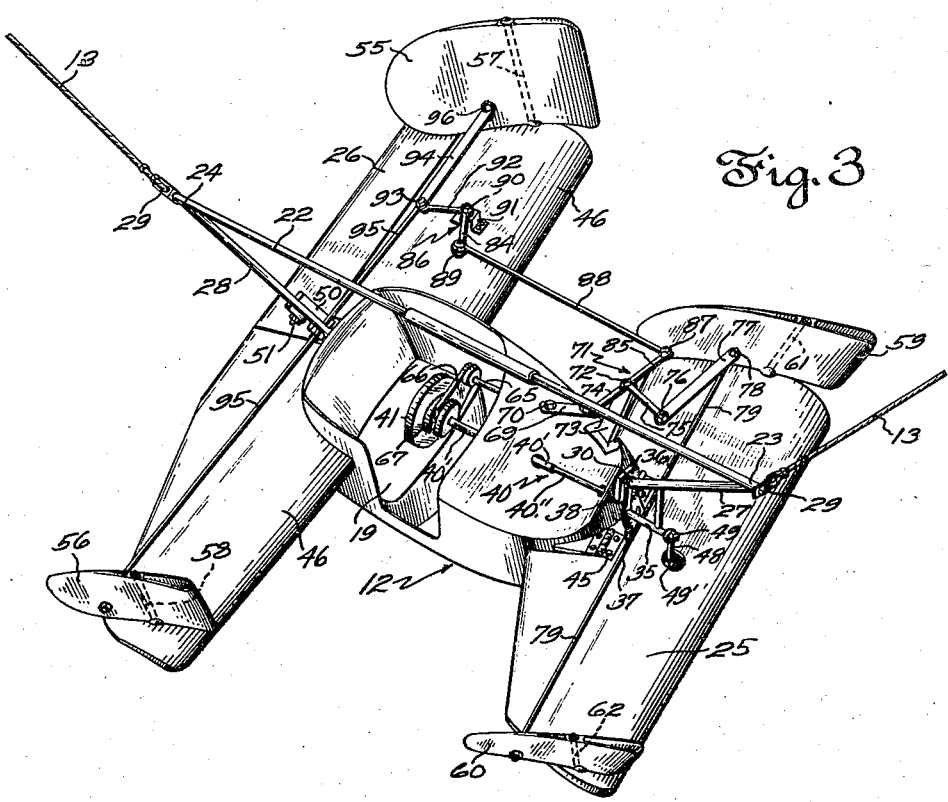

Feb. 17, 1948.　　J. A. A. MESSIER　　2,436,014
CIRCULARLY SWUNG CAPTIVE GLIDER
Filed Jan. 8, 1946　　4 Sheets-Sheet 3

INVENTOR
Joseph A. A. Messier
BY
ATTORNEY

Feb. 17, 1948.　　J. A. A. MESSIER　　2,436,014
CIRCULARLY SWUNG CAPTIVE GLIDER
Filed Jan. 8, 1946　　4 Sheets-Sheet 4

INVENTOR
Joseph A. A. Messier,
BY
ATTORNEY

Patented Feb. 17, 1948

2,436,014

UNITED STATES PATENT OFFICE 2,436,014

CIRCULARLY SWUNG CAPTIVE GLIDER

Joseph A. A. Messier, Northfield, Vt.

Application January 8, 1946, Serial No. 639,791

13 Claims. (Cl. 272—41)

This invention relates to aerial rides particularly for fairs and amusement parks wherein circularly towed captive gliders are swung through the air in a circuitous path curving about a vertical axis while suspended from a power driven, multiple armed overhead reel or rotary carrying structure. The present improvements are particularly concerned with features of construction, equipment and operation of the passenger car making its means of suspension from the rotary carrier controllable by the rider in a manner to enhance the excitement of the ride.

In keeping with popular demand for greater thrills and sensation in the performance of amusement rides and to meet public preference for rides that are more fully passenger controlled, there has been constant attempt to improve the performance of captive gliders in these respects. To this end there has been proposed the use of passenger controlled airfoils, such as ailerons or rudders, with which each passenger car may be equipped so as to be swingable by the passenger in a manner to vary the abruptness and direction of their attack upon the air and thereby swerve the car.

It is an object of this invention to cause more sensational movements of a "flying" captive glider by causing it to respond to rider control in a greater variety of directions and with more nearly the sensitive response of a free flying glider or airplane.

A contributory object is to place constantly under positive control of the passenger the degree of sidewise inclination or banking angularity of the car relative to its suspension cables. These cables shift gradually from vertical disposition and approach a horizontal disposition as their revolutions are speeded up to increase the centrifugal pull upon the passenger car. In all dispositions of such cables however, my improved car can be either leveled off or "banked" to any passenger selected degree. This is accomplished by passenger controlled, positively acting mechanism and does not as heretofore in this art depend solely upon aerodynamic effects of airfoils. Added to this novel principle of positively determined banking angularity, the use in the present improvements of passenger controlled airfoils in the form of tiltable wings, ailerons or rudders gives the ability to attain higher flying levels of travel for the passenger car corresponding to its speed of revolution. These newly possible courses of car travel are not only more widely diversified but are brought more fully and more sensitively under rider control.

It hence is a further object of the invention to equip a glider car thus novelly suspended, with tiltable wings, and/or ailerons, and/or rudders, which may be passenger controlled by special manipulation of the same steering wheel or control column that positively governs the aforementioned banking angularity of the car.

Specifically these improvements aim to provide a push-pull type of steering wheel whose turning movement will vary the sidewise tipping angularity of the passenger car relative to its cables and thereby determine the banking angularity and lifting force of the horizontal airfoils, while axial or push-pull movement of such steering wheel will selectively position certain other airfoils such as rudders to bring into play a choice of aerodynamic effects superimposed upon the chosen banking angularity of the car.

The invention further aims to insure a mechanically predetermined relationship between the banking angularity of the passenger car with respect to its suspension cables and the tilt of certain ailerons relative to the passenger car.

A further object is to mount passenger controlled rudders upon and in swingable relation to passenger controlled ailerons, the latter themselves being passenger controlled in their inclination to the passenger car.

A further object is to make such rudders independently swingable by the passenger while the tilt of the ailerons remains unchanged in relationship to the passenger selected banking angularity of the car.

A no less important accomplishment of this invention is the ability which it affords to enjoy very high flying in a captive glider when the latter is whirled at rotary speeds that are slower than have heretofore been necessary to attain even moderate flying height by centrifugal force alone. From this accomplishment there results reduced strain on the apparatus, as well as less dizziness and greater safety for the passenger, thus enhancing the fun and appeal of the ride.

The foregoing and associated objects of the invention will be more clearly understood from the following description of a successful form of the invention illustrated in the accompanying drawings wherein:

Fig. 3 is a perspective view of one of the passenger cars of Figs. 1 and 2 with its suspension hanger, looking downward from the front thereof.

Fig. 4 is a perspective view in nearly front elevation showing the passenger car in high flying angularity with respect to its suspension hanger.

Figure 1:
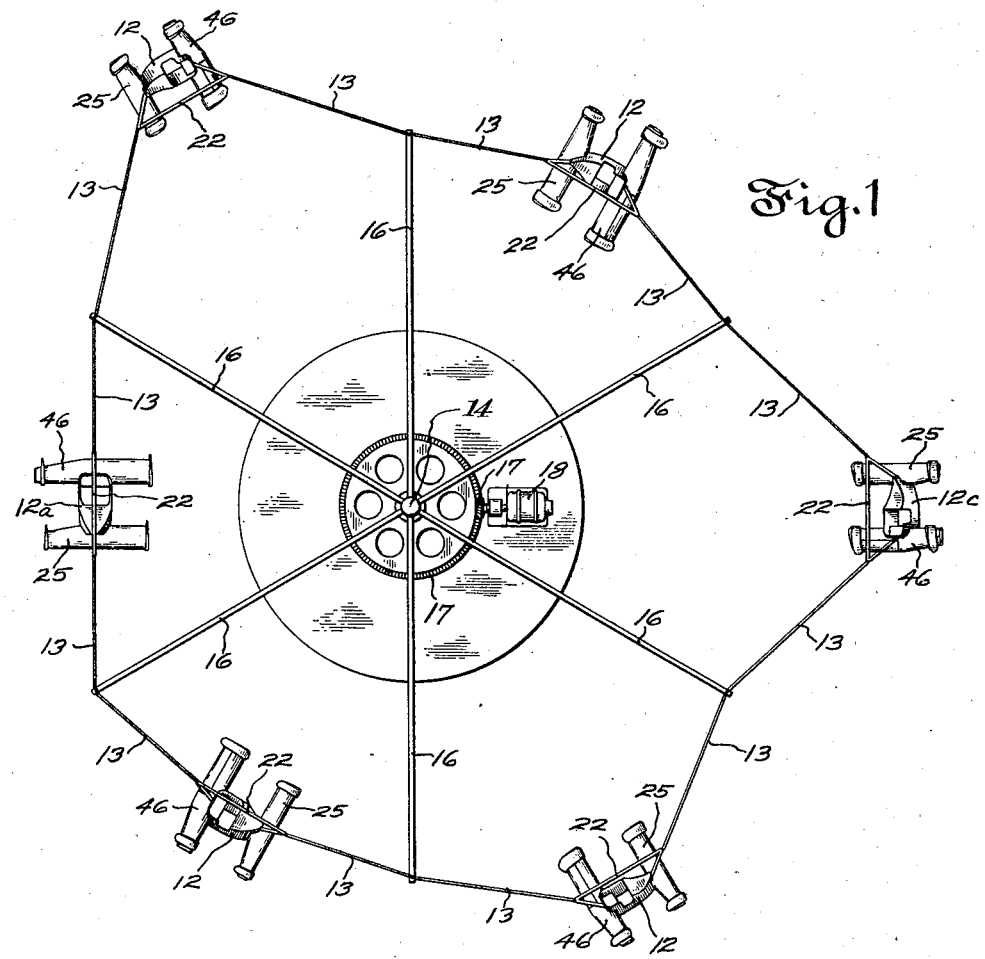
Fig. 1 is a diagrammatic plan view and Fig. 2 is a diagrammatic side view of the main elements of a complete amusement apparatus incorporating captive gliders shown in various positions explanative of the present improvements.
Figure 2:
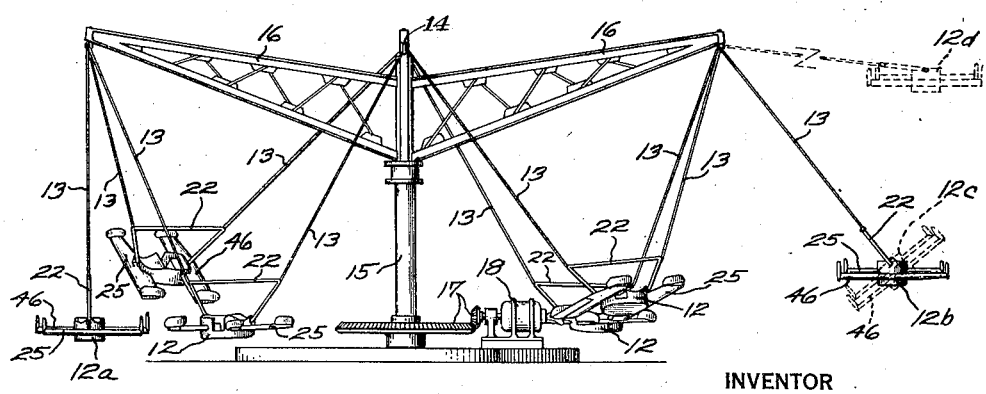
Figure 6:
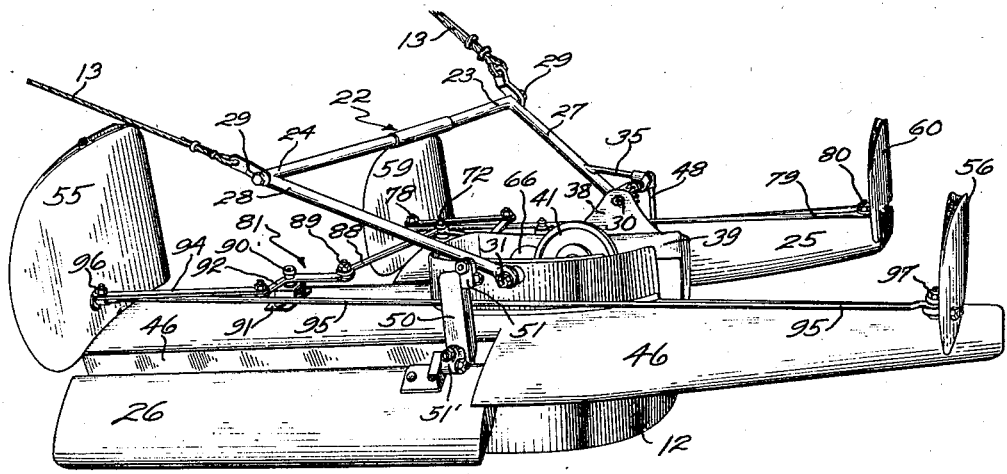
Fig. 6 is a perspective view in nearly rear elevation showing the passenger car in high flying angularity with respect to its hanger.
Figure 5:
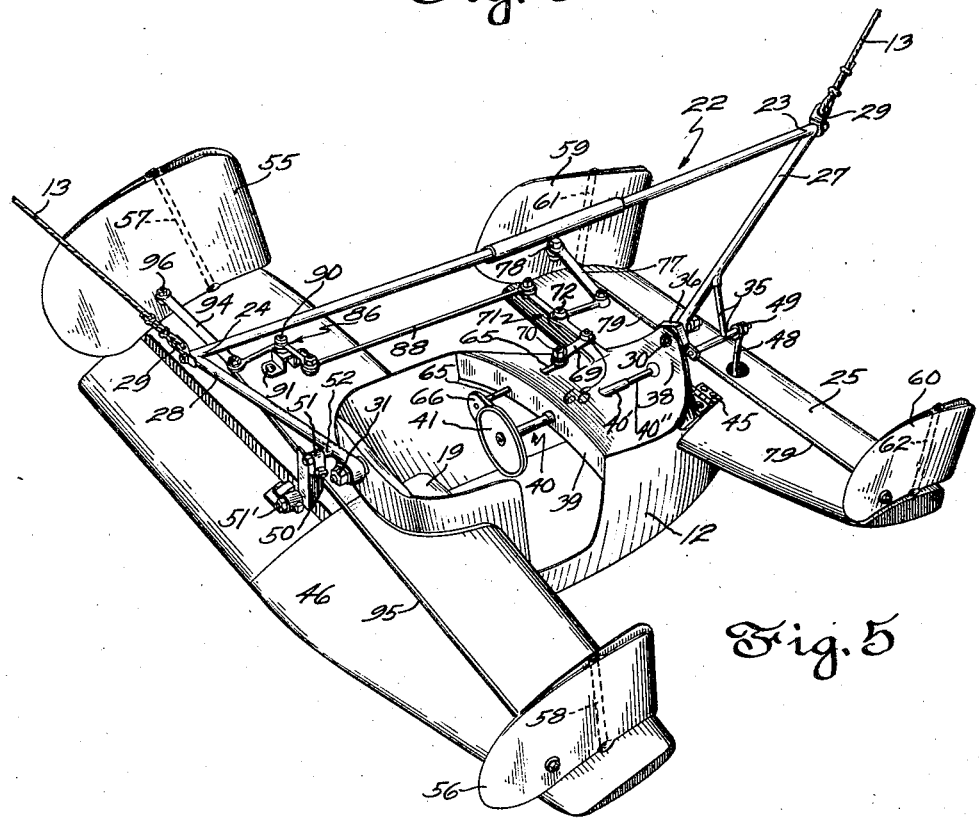
Fig. 5 is a perspective view of the passenger car and its suspension hanger looking downward from the rear thereof.
Figure 9:
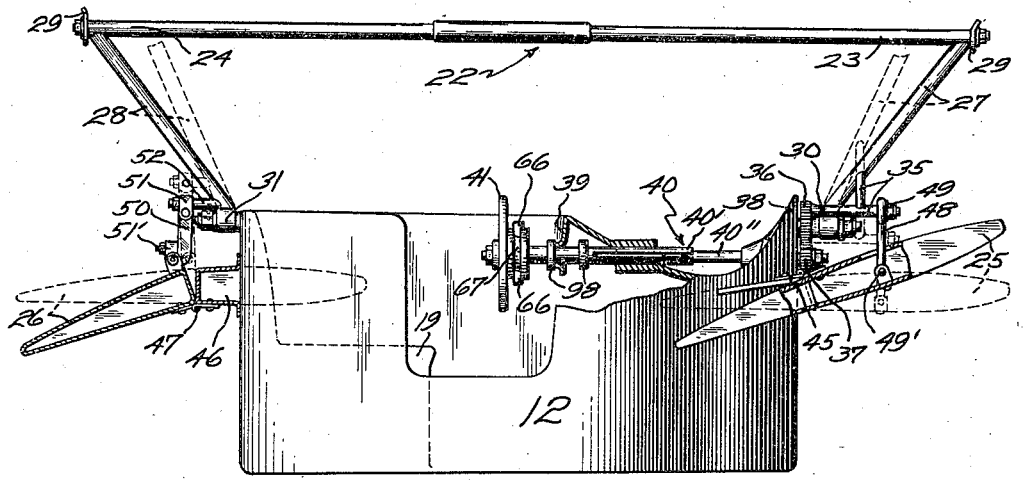
Fig. 9 is a side elevation of the passenger car and its airfoil members broken away to show level and inclined positions of airfoil members corresponding to banked and non-banked angularity of the car.

Figs. 1 and 2 indicate well-known performance features of circularly swung captive gliders which include whirling of the passenger car 12 outward and upward from its idle vertically suspended position of rest shown at 12a to some comparatively elevated "flying" position indicated at 12b.

Each of the cars 12 is suspended by a pair of spaced cables 13 from the revolving tip of a rotary overhead carrying structure 14 which includes the mast 15 and yardarms 16 rigid therewith revolvable about a vertical axis by means of bevel gears 17 powered by a motor 18 mounted on the stationary base of the apparatus. Since the present invention is not limited to particulars of construction of the rotary carrier 14 the showing thereof may be regarded as diagrammatic and illustrative of two revolving overhead spaced anchorages for cables 13. These anchorages, at the tips of yardarms 16, are usually at equal radial distances from the vertical axis of rotation of mast 15, so that a rigid hanger 22 having opposite ends 23, 24 of its horizontal length attached respectively to cables 13 will have its length maintained in a direction tangentially related to the circular path of travel in which the hanger is whirled about the vertical axis of mast 15.

Now were we merely to suspend a passenger car, as 12, from the hanger 22 such car by the combined action of gravity and centrifugal force would normally be caused to bank to some natural degree of inclination relative to the horizontal indicated at 12c in Fig. 2 whenever it is whirled about the vertical axis of mast 15. In banked position 12c, however, it will be noted that there has been no change in lateral angularity of the car relative to its suspension cables 13 since the cables are inclined with respect to the vertical to the same degree that the car is banked with respect to the horizontal. Hence if the car 12 were merely to be equipped with horizontal tiltable airfoil members, such as the front wing 25 and rear aileron 26, in car position 12a, such airfoil members would no longer be horizontal with the car disposed in position 12c. Accordingly in car position 12c the tiltable air foil members 25 and 26 would not attack the air in a direction to exert a maximum aerodynamic vertical lifting power on the passenger car tending to make it ride higher. This maximum lifting effect could result only from an airfoil member such as a wing or aileron inclined to attack the air while its wing length is disposed horizontally. To accomplish this the car with its wing or aileron must change angularity relative to its cables instead of banking relatively to the horizontal.

The position of the car desired for the foregoing purposes is the full line position shown at 12b in Fig. 2. The present invention novelly provides means whereby this car position 12b can be attained at the will of the rider so that full efficiency in the aerodynamic lifting or climbing effect of airfoil members 25, 26 can be exerted causing the car to fly higher at a less given speed of rotation of carrier 14 than could otherwise be possible. Thus the thrill of "high" flying is made possible at slower and safer rotary speeds of the rotary carrying structure. Also there is less dizziness from rapid circular travel to spoil the fun of the ride. A successful arrangement of mechanism for accomplishing this will now be described.

Referring more particularly to Figs. 3 to 9, inclusive, the hanger 22 may comprise an unyielding stiff bail whose straight horizontal section between the elbows 23 and 24 is rigid with stiff converging front and rear arms 27 and 28. By means of pivotal couplings 29, cables 13 are connected respectively to bail elbows 23 and 24 while the free ends of arms 27 and 28 are connected respectively to the leading and trailing ends of passenger car 12 by coaxial pivot pins 30 and 31. Thus car 12 is free to swing about pins 30 and 31 to various degrees of banking and to positions of varying angularity with respect to the hanger bail 22 while stiff arms 27, 28 of the latter extend in substantially coplanar alignment with the cables 13. Thus car 12 is pivotally coupled to hanger 22 in a manner to be bankable to various degrees of angularity relative to cables 13 and the degree of such angularity can be varied at the will of the rider through the action of the following passenger operated control mechanism.

Front bail arm 27 is trussed to form a rigid quadrilateral appendage 35 which is fixed on this arm as is also spur gear sector 36. These therefore become turnable in unison with bail 22 about the axis of pivot pin 30. Acting as a planetary gear in mesh with gear sector 36 there is a spur gear 37 fixed on the front end of a passenger control shaft 40 which shaft is journaled closely to gear 37 in the upturned frame nose 38 of car 12. Shaft 40 is further journaled in the car frame at the instrument panel 39. The rear end of control shaft 40 has fixed thereon the passenger operated control wheel, handle or "stick" 41.

Figures 7, 8:
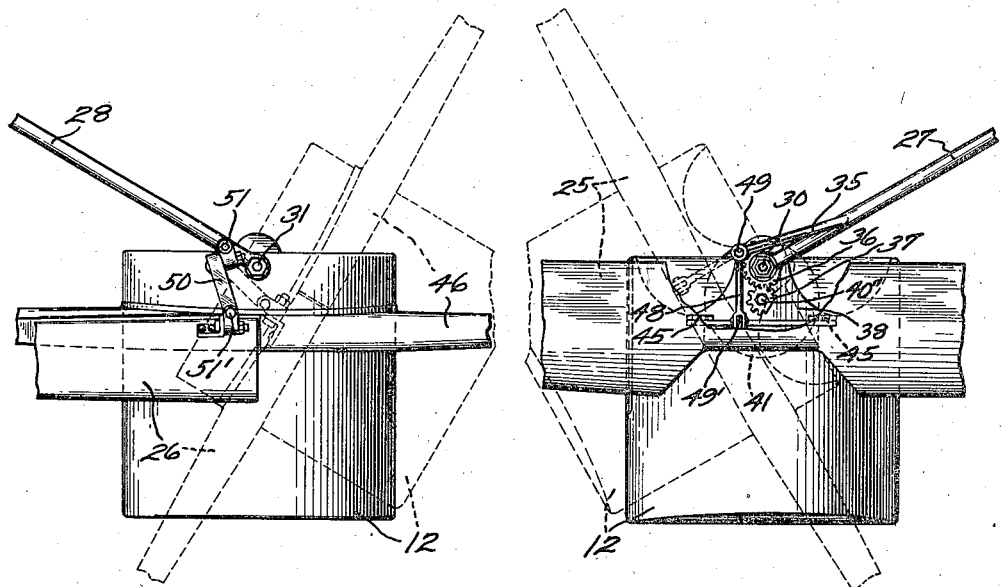
Figs. 7 and 8 are respectively front and rear elevations of the passenger car showing tilted and non-tilted positions of airfoil members corresponding to banked and non-banked angularity of the car relative to its hanger.

The construction just described obviously places the passenger car 12 under rider control as to its banking angularity relative to suspension cables 13 because turning of control wheel 41 will swing the car from its broken line position to its full line position in Figs. 2, 7 and 8. The manual force required of the rider to accomplish this may be slight because any desired multiplication of leverage can be afforded by choice of ratios in the gear train 36, 37. Banking of car 12 about the common horizontal axis of pivot pins 30 and 31 to selective degrees of angularity with respect to cables 13 thereby becomes easy. The car under this positive rider control can be shifted from position 12c to position 12b in Fig. 2, and efficient aerodynamic use of tiltable wings or ailerons for high flying at low whirling speeds becomes possible as next to be described.

Since we now have a means for keeping the car on an even keel as it is swung higher and higher by the centrifugal force of its revolution we are able to make maximum use of the aerodynamic lifting effect of the tiltable front wing 25 and the rear aileron 26 which are under the control of the following mechanism. The front airfoil member or wing 25 is tiltably connected to the car body 12 by a pivotal coupling as hinges 45 which appear in Figs. 3, 5, 7 and 9, and which are located at the forward edge of a cutout in the trailing margin of wing 25 accommodating the nose of the car body while aileron 26 is tiltably connected to the otherwise fixed rear wing 46 by hinges 47 which appear in Fig. 9. The leading edge of rear wing 46 contains a cutout occupied by the rear portion of the car body while the trailing edge of this wing contains a cutout over at least a portion of its spread occupied by the aileron 26. While control means that are independent of the banking angularity of the car 12 relative to its hanger 22 and suspension cables 13 might be provided for tilting the front wing and the rear aileron, there is herein shown a connecting linkage that causes the degree of tilting of these airfoil members always to change in predetermined relation to the banking angularity of the car body.

In the case of the front tilting wing 25 this linkage comprises a short push-pull rod 48 connected preferably by a ball and socket joint or coupling at its top end 49 to the triangular trusswork 35 that is rigid with hanger 22, and rod 48 is similarly connected at its bottom end 49' to the wing 25. In the case of aileron 26, a corresponding linkage consists of a short push-pull rod 50 connected preferably by a universal joint or coupling at its top end 51 to a crank stud 52 fixed on the hanger arm 28 and similarly connected at its bottom end 51' to the aileron. Thus shifting of car body 12 from its broken line position to its full line position in Figs. 2, 7 and 8 simultaneously tilts the nose or leading edge of the front wing 25 upward and the trailing edge of the aileron 26 downward so that the wing and aileron tilt simultaneously from their broken line level positions to their full line tilted positions in Figs. 7, 8 and 9.

Both the front tiltable wing 25 and the rear fixed wing 46 are shaped to possess more airfoil surface near their inner tips, that are directed toward mast 15, than is the case near their opposite or outer tips where the wings are observed to be narrower. This sets up some tendency of the car to level out into a horizontal wing spread at all elevations of "flying" and compensates for the lower linear speed of the inner tip of the wings. The difference in size of the rudders that are near the inner wing tips and the rudders that are near the outer wing tips also compensates for the lower linear speed of the former.

The steering control of rudders 55, 56, 59 and 60 is concentrated in a push-pull rod 65 which has a slide bearing both in the instrument panel 39 and also in the upturned frame nose 38 of the car body alongside control shaft 40. To enable rod 65 to be pushed and pulled by the rider without taking his hands off from control wheel 41, there is fixed on the rear end of rod 65 a spur plate 66 which extends laterally toward control shaft 40 and is received into an annular channel 67 fixed on and forward of wheel 41. Control shaft 40 is contractable lengthwise consisting of an external tubular section 40' fixed to control wheel 41 which is telescopically slidable in lengthwise relation to an internal section 40'' fixed to spur gear 37. Shaft sections 40' and 40'' are splined together so that they always turn in unison yet permit section 40' to be slidable back and forth along section 40''. Thus by pushing and pulling axially on control wheel 41, lengthwise reciprocative movements of rod 65 take place in unison therewith. These reciprocative movements of rod 65 act to swing the four rudders simultaneously by means of a rudder actuating linkage which appears most clearly in Figs. 3 to 6. It is apparent from the foregoing that wheel 41 serves as a control handle that is movable in diverse planes.

The front end of rod 65 is pivotally connected at 70 to one end of a link 69 whose other end is connected at 68 to one arm 74 of a three-armed bell crank lever 71 which is freely swingable about a mounting pivot 72 at the end of a spur bracket 73 projecting from and rigid with the car body 12. A second arm 75 of the bell crank lever 71 is pivotally connected at 76 to a link 77 whose other end is pivotally coupled at 78 to a lug fixed on the side face of rudder 59. From pivot 78 a stiff tie rod 79 extends to a point of pivotal connection 80 to rudder 60 so that rudders 59 and 60 are caused to swing in unison about their respective pivot rods 61 and 62.

The third arm 85 of the three-arm bell crank lever 71 is pivotally connected at 87 to the front end of a stiff push-pull link 88 whose opposite or rear end is pivotally coupled at 89 to one arm 84 of a two-arm bell crank lever 86 which is freely swingable about a mounting pivot 90 on a raised bracket 91 rigid on the rear fixed wing 46. The other arm 92 of bell crank lever 71 is pivotally connected at 93 to one end of a stiff link 94 whose other end is pivotally connected at 96 to a lug fixed on the side face of rudder 55. From pivot 96 a stiff tie rod 95 extends to a point of pivotal connection 97 to rudder 56 so that rudders 55 and 56 are caused to swing in unison about their respective pivot posts 57 and 58.

The operation will be described in the understanding that Figs. 1 and 2 are diagrammatic to the extent that the car designated 12a could not hang straight down with its suspension cables 13 vertical in Fig. 2 if the yardarms or other overhead support structure 16 were revolving at an appreciable speed. These figures of the drawings are further diagrammatic in showing the three next cars regarded in counterclockwise order in Fig. 1, to be swung outward and upward to differing extents. This difference in car elevation is not the natural result of centrifugal force brought into play by uniform angular velocity and in the absence of this invention could be occasioned in the instance of a given car only by increasing rotary speed of the yardarms 16. By means of these improvements, however, the differing flying heights of the three glider cars mentioned newly become possible at the will of the passenger even when all three cars are being whirled simultaneously at a common angular speed of the yardarm 16.

A greatly augmented choice of flying heights is thus made possible by the present improvements through mechanically transmitted passenger control of the sidewise tipping angularity of the glider car 12 relative to its hanger 22. If the rider desires to fly higher than could be caused by centrifugal force alone he will turn the push-pull type of control wheel 41 clockwise in Figs. 5 and 8 or counterclockwise in Figs. 4 and 7, which will cause spur gear 37 to be turned a sufficient amount to level out the glider car from its natural broken-line position of banking angularity in Figs. 2, 7 and 8 to its level flight position shown in full lines in said figures. In this way the wing spread of the glider can be brought as closely as desired to a horizontal level at any "flying" speed of the glider. The wing 25 and the aileron 26 will incline simultaneously more and more steeply from their broken line positions toward their full line positions in Fig. 9, as the sidewise tipping angularity of the car with respect to its suspension cables 13 is purposely increased by the rider. This causes wing 25 and aileron 26 to attack the air and exert an efficient lift force on the car body causing it to "fly" higher than is possible under the influence of centrifugal force alone. It also enables the glider to "fly" as high at a relatively low speed of revolution about the mast 15 as heretofore would have required a much greater and more dangerous speed of revolution of the car about the mast 15. In fact captive gliders have not heretofore been able to "fly high" and still retain their passenger seat on an "even keel" so far as I am informed. Fig. 2 shows a position 12d attainable by my improved glider that presents a more thrilling performance than heretofore known in this art.

At any chosen rotary setting of wheel 41 the rider is further able to manipulate this same wheel like the control column of an airplane by pushing and pulling axially upon it. This will swing the rudders 55, 56, 59 and 60 in unison in either desired direction to exert another aerodynamic effect upon the car and cause the glider to swerve laterally so that its suspension cables 13 can be made to sway inward or outward with respect to the mast 15. The rider is thus able by combined turning and pushing or pulling on the control wheel 41 to nose the car either upward or downward, and simultaneously to swerve it from either side to the other side, and with it all, to "fly" at a higher level than has heretofore been accomplished at a given speed of revolution of a captive glider.

For symmetrical equilibrium I prefer to offset the common axis of pivots 30 and 31 sufficiently inward toward mast 15 from the fore and aft center line of the car to compensate for the greater weight of the larger wing tips and large rudders located at that side of the car. Three inches has been found a suitable extent of offset. Spaced collars 98 fixed on shaft section 40' limit the axial movement of this shaft so that the turning of rudders will not exceed a practical extent in either direction, while safety stops (not shown) will be fixed on car body 12 in the path of swinging movement of hanger arm 27 and/or 28 to limit the banking angularity of car 12 thereto to a practical degree in either direction.

Various substitutes and alternative kinds of mechanisms for enabling the passenger car to be shifted to chosen degrees of banking angularity relative to hanger 22 and/or suspension cables 13 will be suggested to workers skilled in this art by the disclosure hereof. The following claims are directed to and intended to cover all such substitutes and equivalents for the exact parts and arrangements herein shown as fairly come within the scope of the terms used in said claims.

I claim:

1. A circularly swung captive glider comprising in combination with an overhead carrying structure mounted to revolve about a vertical axis, spaced cables hanging from and conveyed by said overhead structure in a path curving about said axis, a hanger elongated in a direction generally tangential to said path having fore and aft ends attached respectively to said cables, a passenger car coupled to said hanger in a manner to be shiftable at least in part to various degrees of banking angularly relative thereto and to said cables, and passenger operated control mechanism operatively connecting said car and said hanger constructed and arranged to determine and vary said banking angularity of said car.

2. A circularly swung captive glider as defined in claim 1, in which the said rider operated control mechanism includes at least two intermeshed gears, one of said gears being fast to the said hanger and another of said gears being fast to the said car and equipped to be manually operable by said passenger.

3. A circularly swung captive glider as defined in claim 1, in which the said passenger operated control mechanism includes a gear fast to the said hanger, a second gear in mesh with the first said gear, and a passenger operated control handle operatively coupled to said second gear.

4. A circularly swung captive glider as defined in claim 1, together with an airfoil member carried by the said passenger car in a manner to be swingable relative thereto.

5. A circularly swung captive glider as defined in claim 1, together with an airfoil member swingably carried by the said passenger car and operatively coupled to the said hanger in a manner to be caused to swing relatively to said car by the said banking movement of said car relative to said hanger.

6. A circularly swung captive glider as defined in claim 1, together with an airfoil member swingably carried by the said passenger car, and a passenger operated control handle movable in diverse planes coupled to the said control mechanism and to said airfoil member in a manner by movement in one of said planes to cause said car to bank relatively to the said cables and by movement from one to another of said planes to cause said airfoil to swing relatively to said car.

7. A circularly swung captive glider as defined in claim 1, in which the said hanger comprises a bail including downward extending stiff branches having their lower ends attached to said car at relatively fore and aft locations thereon.

8. A circularly swung captive glider as defined in claim 1, in which the said control mechanism includes a passenger operated control handle, together with a tiltable wing pivotally mounted on the said car, and a rudder pivotally mounted on said wing in a manner to swing about an axis outstanding from the surface of said wing, both said wing and said rudder being operably connected to said control handle in a manner to be independently movable thereby.

9. A circularly swung captive glider as defined in claim 1, together with a tiltable forward wing pivotally mounted on the said car, a rear wing fixed on said car, an aileron pivotally mounted on said fixed wing, and connections rendering both said forward wing and said aileron operable by the said passenger operated control mechanism.

10. A circularly swung captive glider as defined in claim 1, in which the said control mechanism includes a passenger operated control handle, together with a tiltable forward wing pivotally mounted on the said car, a rear wing fixed on said car, an aileron pivotally mounted on said fixed wing, a rudder pivotally mounted on at least one of said wings to swing about an axis outstanding from the wing surface, and connections rendering said forward wing and said aileron and said rudder selectively operable by the said passenger operated control handle.

11. A captive glider embodying the hollow body of a passenger car, a front wing spreading laterally of the front end of said body, means pivotally coupling said wing to said body, a rear wing fixed to said car body spreading laterally thereof, an aileron pivotally coupled to said rear wing, a hanger from which said car body is pivotally suspended, and movement transmitting connections between said hanger and said front wing and between said hanger and said aileron.

12. A captive glider embodying in combination, the hollow body of a passenger car, a wing spreading laterally of the front end of said body having a leading edge and a trailing edge, said trailing edge containing a cutout occupied by said car body, means at the forward edge of said cutout pivotally coupling said wing to said car body in a manner permitting said wing to tilt relatively to said body, a hanger from which said car body is pivotally suspended, and movement transmitting connection between said hanger and said wing.

13. A captive glider embodying in combination, the hollow body of a passenger car, a wing fixed to said car body spreading laterally thereof having a leading edge and trailing edge, said leading edge containing a cutout occupied by said car body and said trailing edge containing a cutout over at least a portion of its spread, an aileron located in said cutout in said trailing edge, a hanger from which said car body is pivotally suspended, and movement transmitting connection between said hanger and said aileron.

JOSEPH A. A. MESSIER.

REFERENCES CITED

The following references are of record in the file of this patent:

UNITED STATES PATENTS

| Number | Name | Date |
| --- | --- | --- |
| 1,358,246 | Radabaugh | Nov. 9, 1920 |
| 1,965,039 | Hunt | July 3, 1934 |